United States Patent
Tanizaki et al.

(10) Patent No.: US 6,679,925 B1
(45) Date of Patent: Jan. 20, 2004

(54) METHODS OF MANUFACTURING NEGATIVE MATERIAL AND SECONDARY BATTERY

(75) Inventors: Hiroaki Tanizaki, Miyagi (JP); Hiroshi Imoto, Kanagawa (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 09/715,737

(22) Filed: Nov. 17, 2000

(30) Foreign Application Priority Data

Nov. 22, 1999 (JP) .......................... P11-331494

(51) Int. Cl.[7] .......................... H01M 4/58; H01M 4/38; H01M 4/04; C01B 33/06
(52) U.S. Cl. ............... 29/623.1; 429/231.1; 429/218.1; 429/231.95
(58) Field of Search .............................. 29/623.1, 623.5; 429/218.1, 231.1, 231.95, 232; 423/325, 326, 331, 345

(56) References Cited

U.S. PATENT DOCUMENTS

| | | | | |
|---|---|---|---|---|
| 5,126,295 A | * | 6/1992 | Uchino et al. .............. 423/344 |
| 5,249,866 A | * | 10/1993 | Dube et al. .................. 374/163 |
| 6,042,969 A | * | 3/2000 | Yamada et al. ........... 429/218.1 |
| 6,235,427 B1 | * | 5/2001 | Idota et al. ................ 29/623.1 |

FOREIGN PATENT DOCUMENTS

| | | | | |
|---|---|---|---|---|
| JP | 61 091 011 A | * | 5/1986 | ........... C01B/33/04 |
| JP | 03 193 611 A | * | 8/1991 | ................. 423/344 |

* cited by examiner

*Primary Examiner*—Stephen Kalafut
*Assistant Examiner*—Gregg Cantelmo
(74) *Attorney, Agent, or Firm*—Sonnenschein, Nath & Rosenthal LLP

(57) ABSTRACT

A method of manufacturing a negative material and a secondary battery in which a belt-shaped positive electrode and a belt-shaped negative electrode are wound together with a separator in between them to form a wound electrode body. The wound electrode battery is then inserted inside a battery can. Preferably, the negative electrode is produced with crushed silicon or a silicon compound in an oxygen partial pressure atmosphere within a value from higher than 10 Pa to lower than an oxygen partial pressure of air.

12 Claims, 1 Drawing Sheet

METHODS OF MANUFACTURING NEGATIVE MATERIAL AND SECONDARY BATTERY

RELATED APPLICATION DATA

The present application claims priority to Japanese Application No. P11-331494 filed Nov. 22, 1999, which application is incorporated herein by reference to the extent permitted by law.

BACKGROUND OF THE INVENTION

1. Field of the Invention

The present invention relates to methods of manufacturing a negative material containing silicon or a silicon compound, and of manufacturing a secondary battery provided with a negative electrode containing silicon or a silicon compound.

2. Description of the Related Art

In association with a recent miniaturization of electronic devices, a secondary battery with high energy density is required to be developed as a power source used for electric devices. As for a secondary battery in response to such requirement, for example, a lithium secondary battery using lithium (Li) metal as a negative material has been known. However, a lithium secondary battery has a defect such as a short charging-discharging cycle service life, because lithium metal is susceptible to be deposited in a negative electrode, and inactivated.

Therefore, as for a secondary battery which improves a charging-discharging cycle service life, for example, a lithium secondary battery using a negative material capable of occluding and detaching lithium ion has been developed. As for this type of negative material, such carbonaceous materials are conventionally used. Such materials are: one taken advantage of intercalation of lithium ion into interlayers, or the others adopted an occlusion and detachment effect of lithium ion in pores. Accordingly, this lithium ion secondary battery has a characteristic of a long charging-discharging cycle service life without deposition of dendrite in a negative electrode as a lithium secondary battery has. In addition, a carbonaceous material has a characteristic of stability in air and of easy-industrial production.

However, lithium ion is intercalated in the proportion of one lithium to six carbon into interlayers of a carbonaceous material. Therefore, in case of using insertion of lithium ion into interlayers, electric chemical capacity of a negative electrode has maximum limit. Additionally, in case of using occlusion or detachment of lithium ion, it is considered that control of a pore structure may increase sites, which achieves intercalation of lithium ion. However, this is a difficult technique and cannot be effective means for improvement of electric chemical capacity per volume unit and battery capacity per volume unit, because ratio of a carbonaceous material decreases.

Among carbonaceous material annealed at low temperature, there is a well-known carbonaceous material having negative electrode discharging capacity over 1000 mAh/g. This carbonaceous material has a large capacity at the rare potential over 0.8V for lithium metal. Therefore, in case that a positive electrode is formed by metal oxide, it is not a practical manner because its discharge voltage decreases. For this reason, it is difficult that currently used negative materials are applied to a longer continuous use of portable electric devices or higher energy density of power sources.

In view of the above-mentioned facts, it is suggested that a silicon compound are used as a negative material capable of occluding and detaching more lithium ion than a carbonaceous material (see JP Publication Unexamined Application HEI 10 (1998)-83817). A silicon compound has higher density compared with carbonaceous material, and can be intercalated lithium ion into its interlayers or fine voids. Because of this, using a silicon compound in a negative electrode can achieve a large charging-discharging capacity and higher energy density per unit volume. In addition, a silicon compound is also preferable material in industrial use owing to its stability in air by forming an oxide film.

Using a silicon compound in a negative electrode can achieve a large charging-discharging capacity, however, the repeat of charging and discharging seriously decreases a capacity, which causes a short charging-discharging cycle service life.

SUMMARY OF THE INVENTION

The invention has been achieved in consideration of the above problems, and its object is to provide methods of manufacturing a negative material and a secondary battery, which can achieve a large charging-discharging capacity and improvement of a charging-discharging cycle property.

A method of manufacturing a negative material according to the present invention is to manufacture a negative material containing silicon or a silicon compound, and to include a step of crushing silicon or a silicon compound in an oxygen partial pressure atmosphere within a value from higher than 10 Pa to lower than an oxygen partial pressure.

A method of manufacturing a secondary battery according to the present invention is to manufacture a secondary battery including a negative electrode containing silicon or a silicon compound, and to include a step of forming a negative electrode by a negative material containing crushed silicon or a silicon compound in an oxygen partial pressure atmosphere within a value from higher than 10 Pa to lower than an oxygen partial pressure of air.

In a method of manufacturing a negative material according to the present invention, silicon or a silicon compound is crushed in an oxygen partial pressure atmosphere within a value from higher than 10 Pa to lower than an oxygen partial pressure atmosphere of air. A secondary battery using a negative material achieved with this method improves a charging-discharging cycle property.

BRIEF DESCRIPTION OF THE DRAWINGS

These and other objects and features of the present invention will become clear from the following description of the preferred embodiments given with reference to the accompanying drawings, in which.

DETAILED DESCRIPTION OF THE PREFERRED EMBODIMENTS

Figure 1:
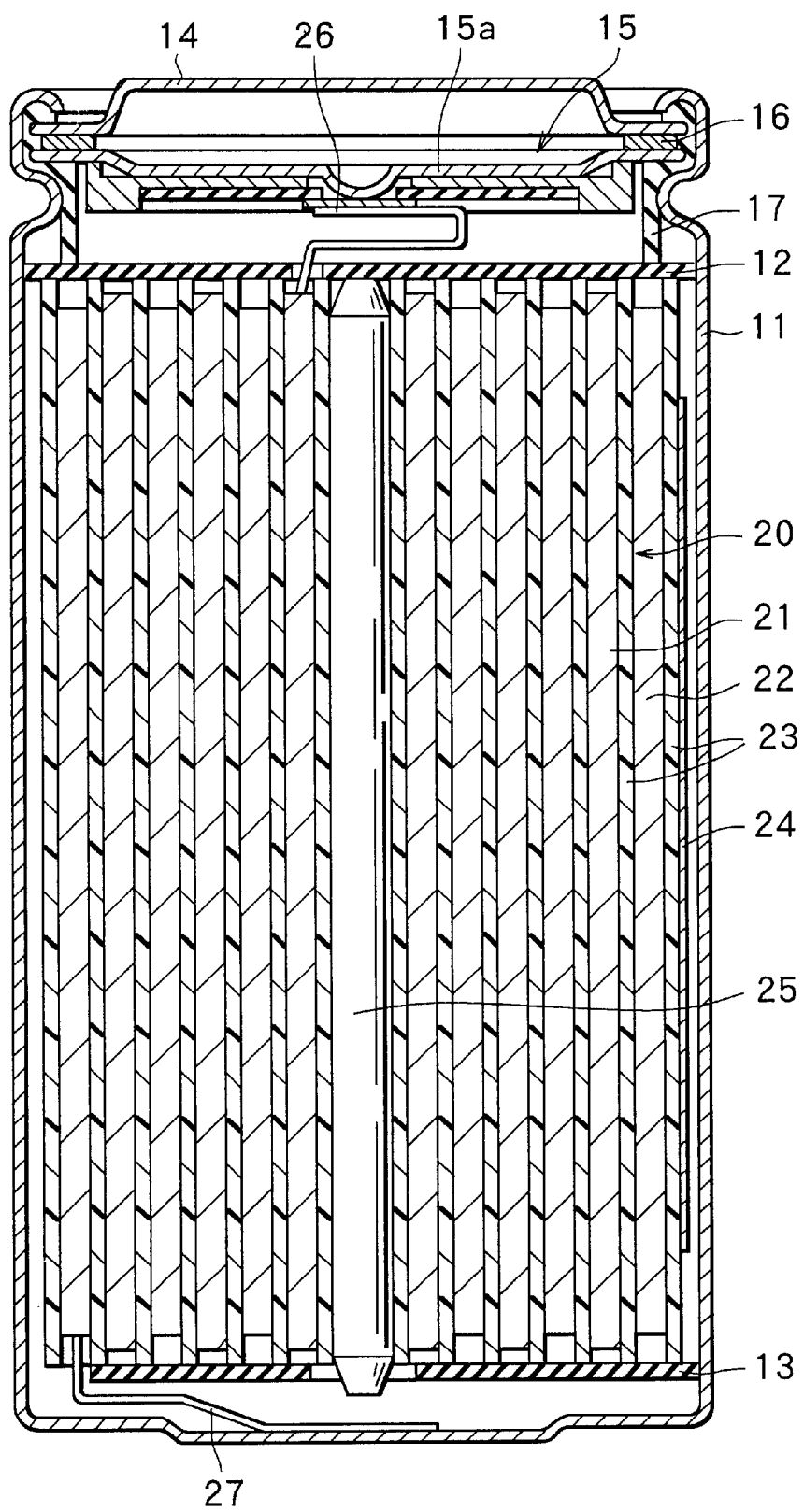
FIG. 1 is a cross sectional view showing a structure of a secondary battery using a negative material manufactured with a method of the present invention.

Embodiments of the invention will be described in detail hereinbelow by referring to the drawing.

A method of manufacturing a negative material related to one aspect of the embodiment of the present invention is to manufacture a negative material containing silicon (Si) or a silicon compound. This negative material may contain silicon and one or more than two kinds of silicon compounds, or more than two kinds of silicon compounds.

In the present embodiment, among silicon or a silicon compound, at least one of them is prepared. As for the silicon compound, for instance, at least one of silicon compounds described after is prepared: $CaSi_2$, $CoSi_2$, $CrSi_2$, $Cu_5Si$, $FeSi_2$, $Mg_2Si$, $MnSi_2$, $MoSi_2$, $NbSi_2$, $NiSi_2$, $TaSi_2$, $TiSi_2$, $VSi_2$, $WSi_2$, $SiC$, $SiB_4$, $SiB_6$, $Si_3N_4$, and $ZnSi_2$. These compounds may be either a stoichiometry or a nonstoichiometric compound.

The silicon compound may be produced by any methods. For example, $Mg_2Si$ are produced by mixing and heating a silicon powder and a magnesium (Mg) powder, then cooling down it.

Then, the prepared silicon compound and the like are crushed in a fine powder state in an oxygen partial pressure within a value from higher than 10 Pa to lower than an oxygen partial pressure of air. As mentioned above, the silicon compound is crushed in a predetermined oxygen partial pressure in order to form a thin oxide film on a surface of the silicon compound and the like, because it prevents forming a thick oxide film on the surface even if the silicon compound is subjected in air. As for the reason of this, it may be considered that a thick oxide film formed on the surface is one of reasons for a short cycle service life of a secondary battery using a negative electrode containing the silicon compound and the like.

That is, an oxide film is formed on the surface of the silicon compound by subjecting in air. However, an oxygen partial pressure is high, say about 20000 Pa, which forms a thick oxide film on the surface. This leads low electric conductivity among particles of the silicon compound and the like and large resist in a secondary battery using these compounds when charging and discharging. For the reason of this, smooth charging-discharging reaction cannot be achieved. Further, the repeat of charging and discharging accordingly weakens a contact state among particles because the silicon compound and the like are expanded and shrunken together with charging and discharging, which increases contact resist. Because of these reasons, smooth electric conductivity among particles is hard to carry out as charging and discharging goes on. Gradually, particles do not contribute for charging and discharging, and the number of such particles increases. This causes a smaller charging-discharging capacity and a short cycle service life. In view of this, in the present method, a thin oxide film is preformed on the surface of the silicon compound and the like to prevent forming a thick oxide film. This improves electric conductivity among particles and enhances a cycle characteristics.

An oxygen partial pressure in air is a value that pressure of air multiples oxygen containing ratio in air, in the case that pressure of air is $1.01325 \times 10^5$ Pa (1 atm), oxygen containing ratio is 0.20948, and an oxygen partial pressure of air is about 21226 Pa. For instance, adjustment of an oxygen partial pressure when crushing is carried out by introducing a small amount of oxygen gas ($O_2$) in an inert gas or a nitrogen gas ($N_2$) atmosphere. As for an inert gas, for instance, argon gas or helium gas are adopted.

For the reason of which an oxygen partial pressure when crushing is determined as a value of higher than 10 Pa, in case that an oxygen partial pressure is determined as a value of 0 Pa, a thick oxygen film is formed after the surface of the silicon compound and the like is subjected in air. In case that an oxygen partial pressure is determined as a value from higher than 0 Pa to lower than 10 Pa, although an oxide film is formed, its thickness is too thin to maintain stability, then when subjecting in air, an oxide film is formed as the same thickness as an oxide film initially formed in air. On the other hand, for the reason of which an oxygen partial pressure is determined as a value of lower than an oxygen partial pressure of air, thickness of an oxygen film becomes thinner than a case in which an oxide film is initially formed in air. For a more appropriate and thinner oxide film, a preferable value of an oxygen partial pressure may be higher than 100 Pa or lower than 20000 Pa, especially, lower than 10000 Pa, more specially, lower than 5000 Pa.

In addition, the silicon compound and the like are crushed in an oxygen partial pressure after oxidization, which cannot be attained a thinner oxide film as described in the present invention, since there are surfaces uncovered with an oxide film by crushing after oxidization, then a thick oxide film is formed on the surfaces of the silicon compound and the like. If oxidization is performed in such an oxygen partial pressure after crushing, a thinner oxide film cannot be attained as described in the present invention. Because it is difficult that all surfaces of particles are subjected to such an oxygen partial pressure, so that it causes an extremely thin oxide film and uncovered surfaces with an oxide film, consequently, a thick oxide film is formed in air.

In case of using a plural kind of silicon compounds and the like, this crushing process can be performed in each of compounds or can be performed at the same time by mixing such compounds. This provides a negative material.

A negative material provided with the above-mentioned manufacturing method is used for the following secondary battery. A secondary battery capable of occluding and detaching lithium ion in a negative electrode will be described by referring an example of a secondary battery hereinafter.

FIG. 1 shows a cross sectional construction of a secondary battery using a negative material manufactured by means of the above-mentioned manufacturing method. This cylindrical-shaped secondary battery is provided with a winding electrode body 20 wound by a belt-shaped positive electrode and a belt-shaped negative electrode within a separator 23 in between inside a general cylindrical shaped battery can 11. Inside the battery can 11, a pair of insulation boards 12 and 13 is disposed in a manner to sandwich the winding electrode body 20 vertically relative to winding surfaces.

In an open end of the battery can 11, a battery lid 14, a safe valve mechanism 15 provided inside the battery lid 14 and a PTC (Positive Temperature Coefficient) element 16 are installed by swaging through a gasket 17. The inside of the battery can 11 is hermetically shielded. The safe valve mechanism 15 is electrically connected to the battery lid 14 through the PCT element 16. In case that the inside pressure of the battery excesses a predetermined value, the same valve mechanism 15 cuts an electrical connection between the battery lid 14 and the winding electrode body 20 by the reverse of a disk board 15a. The PTC element 16 controls electric current by an increase in resist value when temperature rises, and prevents abnormal heating caused by giant electric current.

An adhesive tape 24 fixes an outermost perimeter of the winding electrode body 20. A positive electrode 26 and a negative electrode lead 27 are respectively jutted out from a positive electrode 21 and a negative electrode 22. The positive electrode 26 is electrically connected to the battery lid 14 by welding to the safe valve mechanism 15. On the other hand, the negative electrode 27 is electrically connected to the can 11 by welding thereto.

For instance, the positive electrode 21 has a structure equipped with a positive electrode mix layers on the both sides of a positive electrode collector layer comprised of metallic foil. The positive electrode mix layer consists of the materials: a positive active material, an electrical conducting material such as graphite, and a bonding agent such as fluoride polyvinilidene. For a positive active material, for example, an oxide lithium compound or a sulfide lithium compound is preferable. Especially, an oxide lithium compound containing mainly $Li_xMO_2$ is preferable to increase energy density. As a matter of the fact, more than one kind of transition metal is preferable for M, more concretely, among cobalt (Co), nickel (Ni), and manganese (Mn), at least one kind of compounds is preferable. X is generally a value within $0.05 \leq X \leq 1.10$.

From a point of view, which a charging-discharging capacity becomes increased, it is preferable that the positive electrode 21 contains lithium equal to a charging-discharging capacity over 250 mAh per gram in a negative material in a stationary state (i.e. after 5-time charging and discharging are performed). More preferably, a negative material contains lithium equal to a charging-discharging capacity over 300 mAh per gram, and further preferably, a negative material contains lithium equal to a charging-discharging capacity over 350 mAh per gram. However, lithium is not always necessary to be provided from the positive electrode 21, it may be existed in all parts of the battery. In addition, the amount of lithium is judged by measuring a discharging capacity of a battery.

The negative electrode 22 has a structure equipped with negative electrode mix layers on the both sides of a negative electrode collector layer comprised of metallic foil the same as the positive electrode 21. The negative electrode mix layer contains a negative material manufactured by a method of manufacturing a negative material relates to the present embodiment and a bonding agent such as fluoride polyvinilidene. This structure improves electrical conductivity among particles of the negative material and enhances a charging-discharging cycle property. A preferable structure of the negative electrode mix layer 22B may contain the negative material such as lithium metal, lithium alloy, or carbonaceous material capable of occluding and detaching lithium ion, oxide material and polymer material and so on. Among such material, a carbonaceous material is preferable because its crystal structure changes rarely while charging and discharging. For example, non-graphitizing material, soft carbon, graphite or carbon black can be considered as a carbonaceous material. Tin oxide can be considered as an oxide material. Polyacetylene and polypyrrole can be considered as a polymer material.

The separator 23 consists a porous membrane contained polyolefin material such as polypropylene or polyethylene, or a porous membrane contained inorganic material such as ceramic nonwoven fabric. A structure laminated with more than two kinds of porous membranes may be acceptable.

Electrolytic solution is impregnated in the separator 23. The electrolytic solution is produced by dissolving lithium salt in organic solvent as electrolytic salt. Such preferable organic solvent are: propylene carbonate, ethylene carbonate, diethyl carbonate, dimethyl carbonate, 1,2-dimethoxiethane, 1,2-diethoxiethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propionitrile, anisole, acetic ester, butyral ester and propionic nitrile. The above-mentioned organic solvent may be used by mixing more than two kinds of them.

Such preferable lithium salt are: $LiClO_4$, $LiAsF_6$, $LiPF_6$, $LiBF_4$, $LiB(C_6H_5)_4$, $CH_3SO_3Li$, $CF_3SO_3Li$, $LiCl$ or $LiBr$. The above-mentioned lithium salt may be used by mixing more than two kinds of them.

The secondary battery can be manufactured as described hereinafter.

First, a positive electrode mix material is adjusted by mixing a positive active material, an electrical conducting material, and a bonding agent, and then the mixture is dispersed to flux such as N-methyl-pyrolidone to produce a positive electrode mix slurry. Then, this positive electrode mix slurry is coated on the both sides of a positive electrode collector layer to dry, and formed a positive electrode mix layer by compression molding to produce the positive electrode 21.

Next, a negative electrode material produced by the method of the embodiment in the present invention is mixed with other negative electrode materials if needed and a bonding agent and the mixture is dispersed to flux such as N-methyl pyrolidone to produce a negative electrode mix slurry. Then this negative electrode mix slurry is coated on the both sides of a negative electrode collector layer to dry, and formed a negative electrode mix layer by compression molding to the negative electrode 22.

Moreover, the positive electrode 26 and the negative electrode lead 27 are respectively installed to the positive electrode 21 and the negative electrode 22. The positive electrode 21 and the negative electrode 22 are wound many times in a roll way within the separator 23 in between. After winding, the negative electrode lead 27 is welded to the battery can 11, and the positive electrode 26 is welded to the safe valve mechanism 15. The wound positive electrode 21 and the wound negative electrode 22 are sandwiched with the insulators 12 and 13, and then stored inside the battery can 11. Electrolytic solution is implanted inside the battery can 11 to impregnate the separator 23. The battery lid 14, the safe valve mechanism 15 and the PTC element 16 are swaged through the gasket 17 to be fixed. The secondary battery shown in FIG. 1 is manufactured with the above-mentioned process.

According to a method of manufacturing the negative material of the embodiment, improvement of electron conductivity among particles of the negative material is attained by crushing the silicon compound in an oxygen partial pressure atmosphere within a value from higher than 10 Pa to lower than an oxygen partial pressure of air. For this reason, if the negative material produced by this method is used for manufacturing a secondary battery, it can achieves a large charging-discharging capacity and enhances a charging-discharging cycle property, which results in a long service life.

Embodiment

Further, a concrete embodiment of the present invention will be described by referring to FIG. 1.

EXAMPLES 1–8

First, 281 g. of powder-state silicon and 486 g. of powder-state magnesium were mixed. The mixture was stored in an iron boat and heated at 1200° C. in a hydrogen stream and cooled down at room temperature to acquire a material in lump form. Next, the achieved lump was crushed with a bowlmill in a mixture atmosphere of oxygen gas and argon gas to acquire a powder. At this moment, an oxygen partial pressure changed respectively as shown in Examples 1–8 of Table 1. With Scanning Electron Microscope (SEM), the achieved powders of examples 1–8 were observed to measure average particle size, which were respectively about 5 µm. Furthermore, structural analysis was performed with X-ray diffraction analysis. The achieved diffraction peaks were similar to a diffraction peak of $Mg_2Si$ registered in JCPDS file, which confirmed that the achieved powders were $Mg_2Si$.

Table 1

Non-graphitizing carbon material having a property similar to glass-like carbon was achieved by annealing phenolic resin at 1000° C. in a nitrogen atmosphere. Structural analysis was performed into achieved non-graphitizing carbon material with X-ray diffraction analysis, and as a result, it was confirmed that spacing of a (002) face was 0.376 nm. Additionally, true density, which was required on the basis of JIS 7212 true density $\rho_B$ according to butanol low is 1.58 g/cm³. After this, the achieved non-graphitizing carbon material was crushed using a bowlmill in a nitrogen atmosphere to be a powder state. The achieved powder was observed to measure average particle size, which was about 50 µm.

After acquiring the $Mg_2Si$ powder and the non-graphitizing carbon material powder, a negative electrode mix was adjusted by mixing by the following ratio: 30 part by weight of the $Mg_2Si$ powder, 60 part by weight of the non-graphitizing carbon material, and 10 part by weight of fluoride polyvinilidene as a bonding agent, and it was dispersed to N-methyl-2-pyrolidone, which was flux for producing a negative electrode mix slurry. This negative electrode mix slurry was coated to dry on the both sides of the negative electrode collector layer consisting belt-like copper foil whose thickness was 10 µm, and subjected to compression molding by adding a predetermined pressure to produce the negative electrode 22. After producing the negative electrode 22, a negative electrode lead made of copper was installed to one end of the negative electrode 22.

222 g. of carbonic acid lithium ($Li_2CO_3$) and 482 g. of cobalt tetraoxide ($C_{o3}O_4$) were mixed and annealed at 800° C. for 15 hours in air, which resulted in a powder-state material. Structural analysis was performed with X-ray diffraction analysis, and then it was found that an achieved diffraction peak was similar to a diffraction peak of $LiCoO_2$, which confirmed that the achieved powder was $LiCoO_2$. This $LiCoO_2$ powder was crushed with a bowlmill. The crushed $LiCoO_2$ powder was observed to measure average particle size, which was 15 µm.

A positive electrode mix was adjusted by mixing by the following ratio: 91 part by weight of the crushed $LiCoO_2$ powder as a positive active material, 5.5 part by weight of scale-like graphite and 0.5 part by weight of carbon black as an electrical conducting material, and 3 part by weight of fluoride polyvinilidene as a bonding agent, and the mixture was dispersed to N-methyl-2-pyrolidone, which was flux to produce a positive electrode mix slurry. This positive electrode mix slurry was coated to dry on the both sides of a positive electrode collector layer consisting aluminum foil and subjected to compression molding by adding a predetermined pressure to produce the positive electrode 21. After producing the positive electrode 21, an aluminum positive electrode lead was installed to one end of the positive electrode 21.

After producing the positive electrode 21 and the negative electrode 22, the separator 23 consisting of a fine porous polypropylene film whose thickness was 25 µm was prepared. The winding electrode body 20 was manufactured by laminating in an order like this: the negative electrode 22, the separator 23, the positive electrode 21 and the separator 23 and by winding many times in a roll way. Its outmost was fixed with the adhesive tape 24. An outer shape of the winding electrode body 20 was determined as 17 mm.

After producing the winding electrode body 20, a pair of the insulators 12 and 13 sandwiched the winding electrode body 20. The negative electrode lead 27 was welded to the battery can 11, and the positive electrode lead 26 was welded to the safe valve mechanism 15. The winding electrode body 20 was stored inside the battery can 11, then electrolytic solution was implanted therein. Electrolytic solution was liquid-typed electrolyte mixed ethylene carbonate and dimethyl carbonate in the same ratio, and was dissolved 1.5 mol/liter of $LiPF_6$ as electrolyte salt. The battery lid 14 was swaged to the battery can 11 through the gasket 17 whose surface was coated with asphalt. This provided a cylindrical-shaped secondary battery measured 18 mm diameter, height 65 mm shown in FIG. 1. In addition, Examples 1–8 were under the same condition except in that an oxygen partial pressure was different when crushing to produce a $Mg_2Si$ powder.

A charging-discharging test was performed at 20° C. for the secondary battery achieved by the above-mentioned method. When testing, charging was performed until battery voltage reaches 4.2V in constant current, and discharging was performed until battery voltage reaches 2.5V, which requires ratio of discharging capacity in 100 cycle relative to discharging capacity in the first cycle (Namely, capacity maintaining ratio in 100 cycle was required). Required results were shown in Table 1. Initial charging-discharging capacity was almost the same in any secondary batteries of Examples 1–8.

As for Comparative example 1 relative to Examples 1–8, a $Mg_2Si$ powder was produced in the same manner as Examples 1–8 except in that an oxygen partial pressure was determined as a value of 2 Pa at crushing when producing a $Mg_2Si$ powder. Additionally, as for Comparative example 2 relative to Examples 1–8, a $Mg_2Si$ powder was produced in the same manner as Examples 1–8 except in that a $Mg_2Si$ powder was crushed in air. As for Comparative examples 1 and 2, a charging-discharging test was performed in the same manner as Examples 1–8 to require the capacity maintaining ratio in 100 cycle. The achieved results were shown in Table 1. As for a secondary battery relative to Comparative examples 1 and 2, initial charging-discharging capacity was almost the same as initial charging-discharging capacity of Examples 1–8.

As shown in Table 1, the secondary batteries of Examples 1–8 had the higher capacity maintaining ratio in 100 cycle than that of Comparative examples 1 and 2. That was, it was found that a charging-discharging cycle property could be improved by using the crushed $Mg_2Si$ powder in an oxygen partial pressure atmosphere within a value from higher than 10 Pa to lower than an oxygen partial pressure of air. As for Examples 1–6, high remarkable capacity maintaining ratio was acquired. Therefore, it was found that in case that an oxygen partial pressure when crushing was determined as a value from higher than 10 Pa lower than 10000 Pa, a charging-discharging cycle property could be much improved. Further, as for Examples 2–5, it was found that in case that higher capacity maintaining ratio was acquired and an oxygen partial pressure when crushing was a value form higher than 100 Pa and lower than 5000 Pa, which could achieve much higher capacity maintaining ratio.

EXAMPLES 9–13

First, Kojundo Chemical Laboratory Co., Ltd made silicon powder whose average particle size was 10 µm, was crushed with a bowlmill in a mixture atmosphere of oxygen gas and argon gas. At this time, an oxygen partial pressure of Examples 9–13 changed as shown in Table 2. The achieved powders of Examples 9–13 were observed with SEM to measure average particle size, which was about 1 $\mu$m. Then, a secondary battery was produced in the same manner as Examples 1–8 except in that a $Mg_2Si$ powder was replaced with crushed silicon powder. A charging-discharging test of this secondary battery was also performed in the same manner as Examples 1–8, which required the capacity maintaining ratio in 100 cycle. The achieved results were shown in Table 2. Any secondary batteries of Examples 9–13 had the almost same initial charging-discharging capacity.

TABLE 1

|  | oxygen partial pressure (Pa) | capacity maintaining ratio (%) |
| --- | --- | --- |
| example 1 | 10 | 85 |
| example 2 | 100 | 94 |
| example 3 | 500 | 93 |
| example 4 | 3000 | 92 |
| example 5 | 5000 | 92 |
| example 6 | 10000 | 88 |
| example 7 | 15000 | 65 |
| example 8 | 20000 | 61 |
| comparative example 1 | 2 | 60 |
| comparative example 2 | oxygen partial pressure of air (≈21226) | 60 |

Table 2

As for Comparative example 3 relative to Examples 9–13 in Table 2, a secondary battery was produced in the same manner as Examples 9–13 except in that an oxygen partial pressure was determined as a value of 2 Pa when crushing the silicon compound. Additionally, as for Comparative Example 4, a secondary battery was produced in the same manner as Examples 9–13 except in that a silicon powder was crushed in air. In relation with Comparative examples 3 and 4, a charging-discharging test was performed in the same manner as Examples 9–13, which required the capacity maintaining ratio in 100 cycle. The achieved results were shown in Table 2. As for a secondary battery relative to Comparative examples 3 and 4 had initial charging-discharging capacity was almost the same as the initial charging-discharging capacity of Examples 9–13.

As shown in Table 2, secondary batteries of Examples 9–13 has higher capacity maintaining ratio in 100 cycle than that of Comparative examples 3 and 4. It was found that a charging-discharging cycle property could be improved by using a crushed silicon powder in an oxygen partial pressure atmosphere within a value from higher than 10 Pa to lower than an oxygen partial pressure of air. As for examples 10–12, highly remarkable capacity maintaining ratio could be achieved. Therefore, it was found that in case that an oxygen partial pressure when crushing was a value from higher than 100 Pa and lower than 10000 Pa, which could achieve much improved charging-discharging cycle property.

TABLE 2

|  | oxygen partial pressure (Pa) | capacity maintaining ratio (%) |
| --- | --- | --- |
| example 9 | 10 | 62 |
| example 10 | 100 | 71 |
| example 11 | 5000 | 72 |
| example 12 | 10000 | 70 |
| example 13 | 20000 | 53 |
| comparative example 3 | 2 | 42 |
| comparative example 4 | oxygen partial pressure of air (≈21226) | 50 |

In connection with this, although concrete explanation will be omitted, using other silicon compounds as a negative material gains the same results. Mixture of silicon and the silicon compound as a negative material also gives the same results.

As described above, the present invention has been explained by referring the embodiment and the examples. However, it is not limited by the above embodiments of examples and can be changed variously. For example, in the above examples, it explains a case that the silicon compound is crushed in the atmosphere using argon gas as inert gas. On top of that, other inert gas such as helium gas or nitrogen gas can be used.

In the embodiment, although a step of crushing the silicon compound in a predetermined oxygen partial pressure atmosphere has been explained as a method of manufacturing a negative material, other steps such as a mixture of other negative material can be included. In this case, after crushing the silicon compound in a predetermined oxygen partial pressure, other negative material can be mixed with a crushed silicon compound and so on, or after mixing other negative material and the silicon compound, it can be crushed in a predetermined oxygen partial pressure atmosphere.

Moreover, in the above-mentioned embodiment and examples, although a secondary battery capable of occluding and detaching lithium ion in a negative electrode has been described, the present invention can be applied to a secondary battery capable of occluding and detaching other light metal ion such as sodium (Na), potassium (K), magnesium (Mg), calcium (Ca). In this case, metal oxide or sulfur metal in response to the object as a positive active material is employed and metal salt is employed as electrolyte salt.

Furthermore, in the embodiment and examples, a secondary battery using electrolytic solution which is liquid-typed electrolyte has been described, in replace of electrolytic solution, other electrolytic solution can be employed such as gel-typed electrolyte whose polymer compounds maintaining electrolytic solution, solid-typed electrolyte dissipating electrolyte salt to polymer compounds contained ion conductivity or inorganic electrolyte.

Still more, in the above-mentioned embodiment or examples, the cylindrical-shaped secondary battery having a winding structure has been described concretely by an example. The present invention can be applied to a cylindrical-shaped secondary battery having other structures. In addition, secondary batteries having other shapes such as a coin shape, a button shape or a square shape can be applied.

As described above, according to a method of manufacturing a negative material of the invention, silicon or the silicon compound is crushed in an oxygen partial pressure atmosphere within a value from higher than 10 Pa to lower than an oxygen partial pressure atmosphere of air so that it attains improvement of electron conductivity among particles of a negative material.

According to the secondary battery one aspect of the invention, a negative electrode is formed by a negative material containing crushed silicon or the silicon compound in an oxygen partial pressure atmosphere within a value from higher than 10 Pa to lower than an oxygen partial pressure of air so that it enhances a charging-discharging cycle property and achieves a longer service life.

Obviously, many modifications and variations of the present invention are possible in the light of the above teachings. It is therefore to be understood that within the scope of the appended claims the invention may be practiced otherwise than as specifically described.

While the invention has been described with reference to specific embodiment chosen for purpose of illustration, it should be apparent that numerous modifications could be made there to by those skilled in the art without departing from the basic concept and scope of the invention.

What is claimed is:

1. A method of manufacturing a negative electrode for a nonaqeous secondary battery comprising the steps of:
    crushing silicon compound in an oxygen partial pressure atmosphere within a value from higher than 10 Pa to lower than 20000 Pa; and
    forming a negative electrode with a negative electrode material comprising said crushed silicon compound.

2. A method of manufacturing a negative electrode according to claim 1 wherein said step of crushing a silicon compound in a mixture atmosphere of oxygen and inert gas, or in a mixture atmosphere of oxygen and nitrogen.

3. A method of manufacturing a negative electrode according to claim 2, wherein the inert gas is argon gas or helium gas.

4. A method of manufacturing a negative electrode according to claim 1, wherein the silicon compound is at least one material selected from the group consisting of: $CaSi_2$, $CoSi_2$, $CrSi_2$, $Cu_5Si$, $FeSi_2$, $Mg_2Si$, $MnSi_2$, $MoSi_2$, $NbSi_2$, $NiSi_2$, $TaSi_2$, $TiSi_2$, $VSi_2$, $WSi_2$, $SiC$, $SiB_4$, $SiB_6$, $Si_3N_4$ and $ZnSi_2$.

5. A method of manufacturing a negative electrode according to claim 1, wherein the silicon compound is $Mg_2Si$.

6. A method of manufacturing a nonaqueous secondary battery including a negative electrode containing a silicon compound, comprising steps of:
    crushing a silicon compound in an oxygen partial pressure atmosphere within a value form higher than 10 Pa to lower 20000 Pa to form a negative electrode material comprising said silicon compound; and
    forming a negative electrode with said negative electrode material.

7. A method of manufacturing a nonaqueous secondary battery according to claim 6 comprises a step of forming a negative electrode by a negative material containing crushed silicon compound in a mixture atmosphere of oxygen and inert gas, or in a mixture atmosphere of oxygen and nitrogen.

8. A method of manufacturing a nonaqueous secondary battery according to claim 7, wherein the inert gas is argon or helium gas.

9. A method of manufacturing a nonaqueous secondary battery according to claim 6, wherein the silicon compound is at least one material selected from the group consisting of: $CaSi_2$, $CoSi_2$, $CrSi_2$, $Cu_5Si$, $FeSi_2$, $Mg_2Si$, $MnSi_2$, $MoSi_2$, $NbSi_2$, $NiSi_2$, $TaSi_2$, $TiSi_2$, $VSi_2$, $WSi_2$, $SiC$, $SiB_4$, $SiB_6$, $Si_3N_4$ and $ZnSi_2$.

10. A method of manufacturing a nonaqueous secondary battery according to claim 6 wherein the silicon compound is $Mg_2Si$.

11. A method of manufacturing a nonaqueous secondary battery according to claim 6 comprises a step of mixing crushed silicon compound in a mixture atmosphere of oxygen and inert gas and carbonaceous material.

12. A method of manufacturing a nonaqueous secondary battery according to claim 6, comprising steps of:
    producing a negative electrode by forming a negative electrode mix layer containing a negative material on a negative electrode collector layer;
    producing a positive electrode by forming a positive electrode mix layer containing a positive material on a positive electrode collector layer; and
    producing a winding electrode body by winding the negative electrode and the positive electrode within a separator in between.

* * * * *